Figure 4:
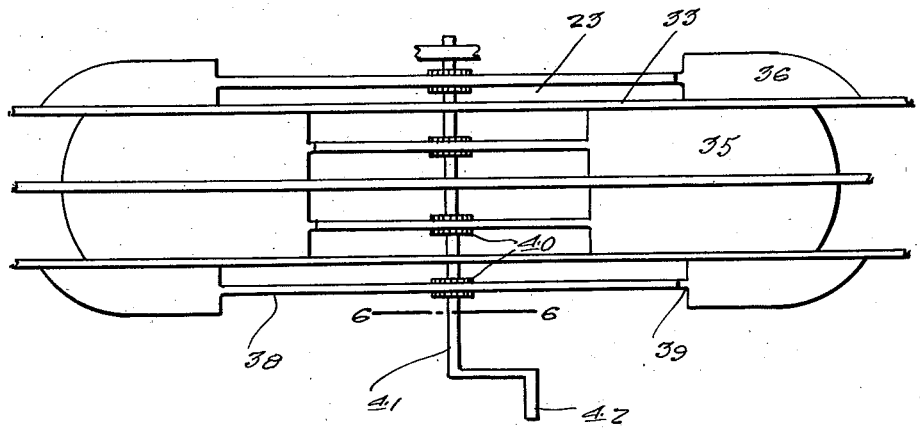

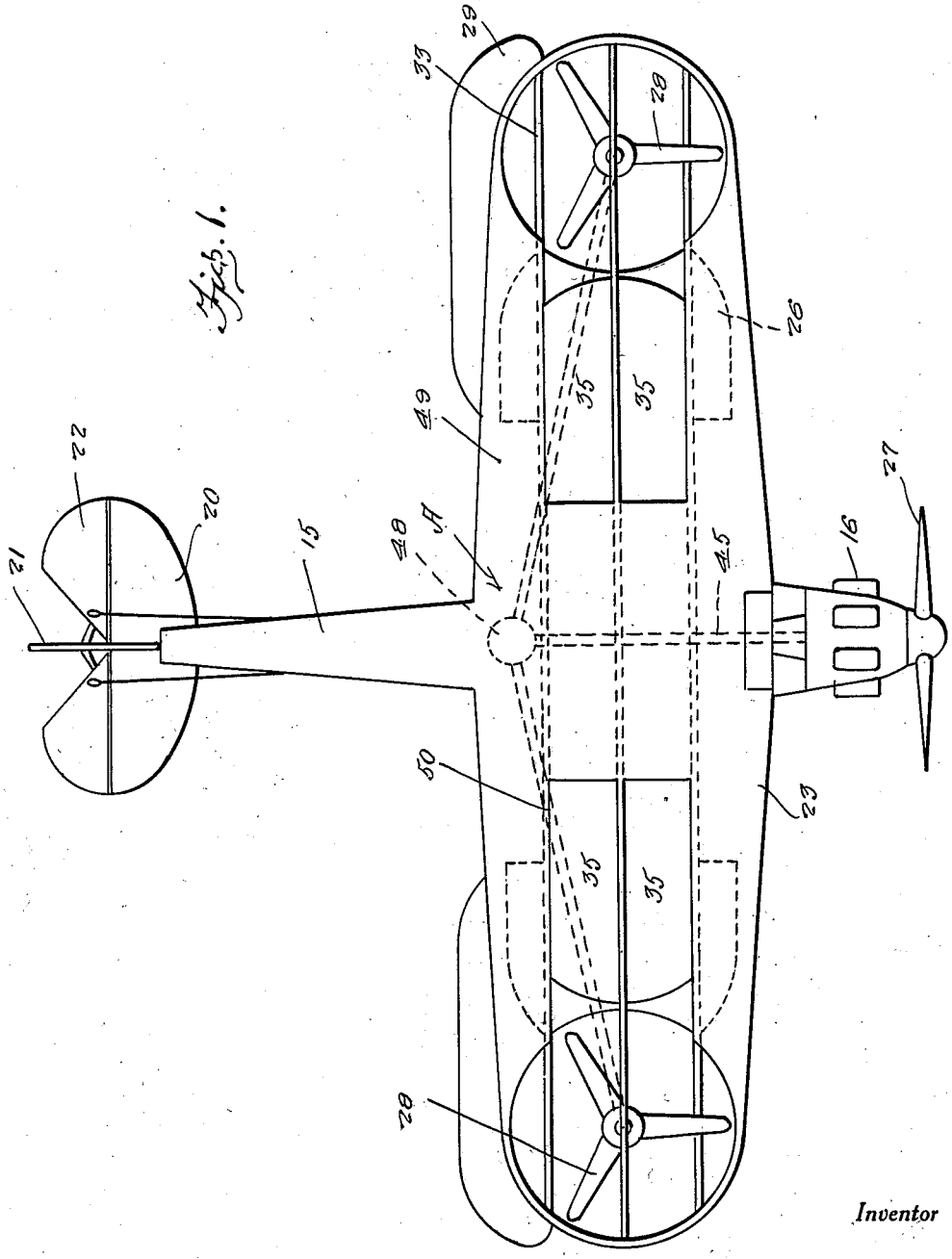

July 1, 1930. F. C. BONEY 1,769,487
AEROPLANE
Filed Oct. 7, 1929 5 Sheets-Sheet 2
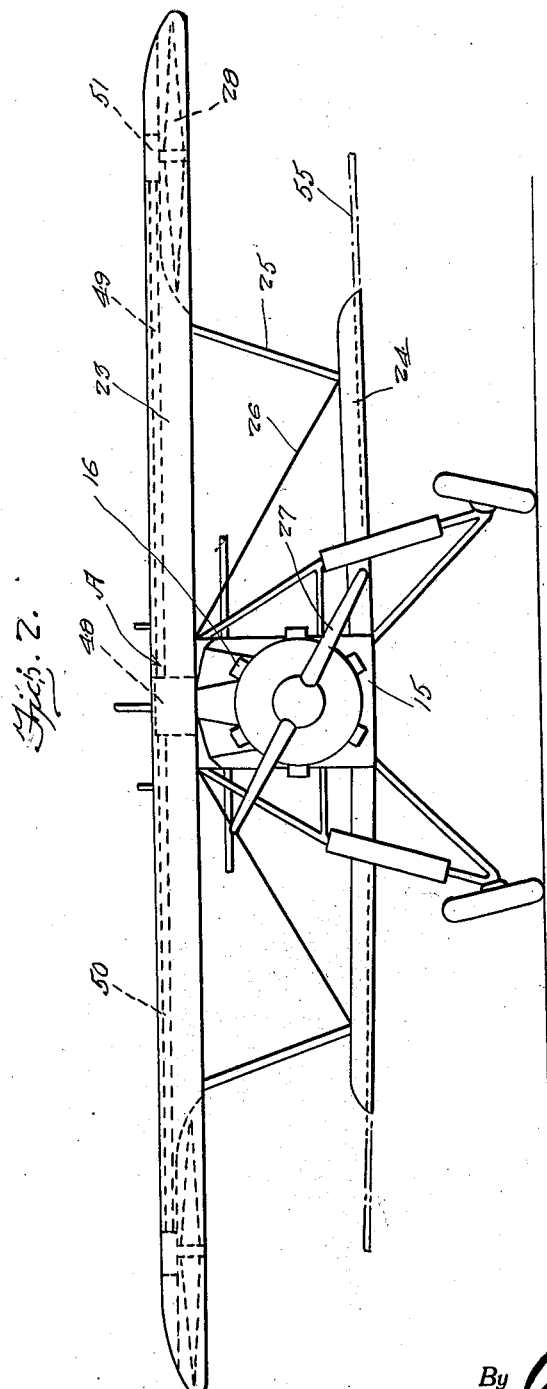
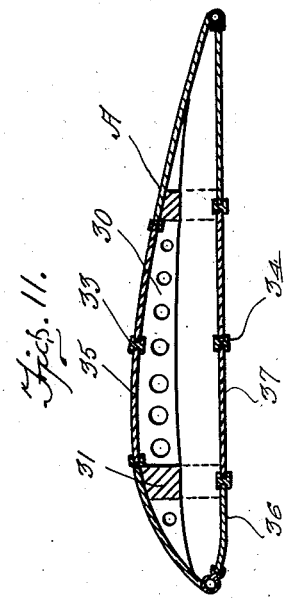
Inventor
Floyd C. Boney
By Clarence A. O'Brien
Attorney

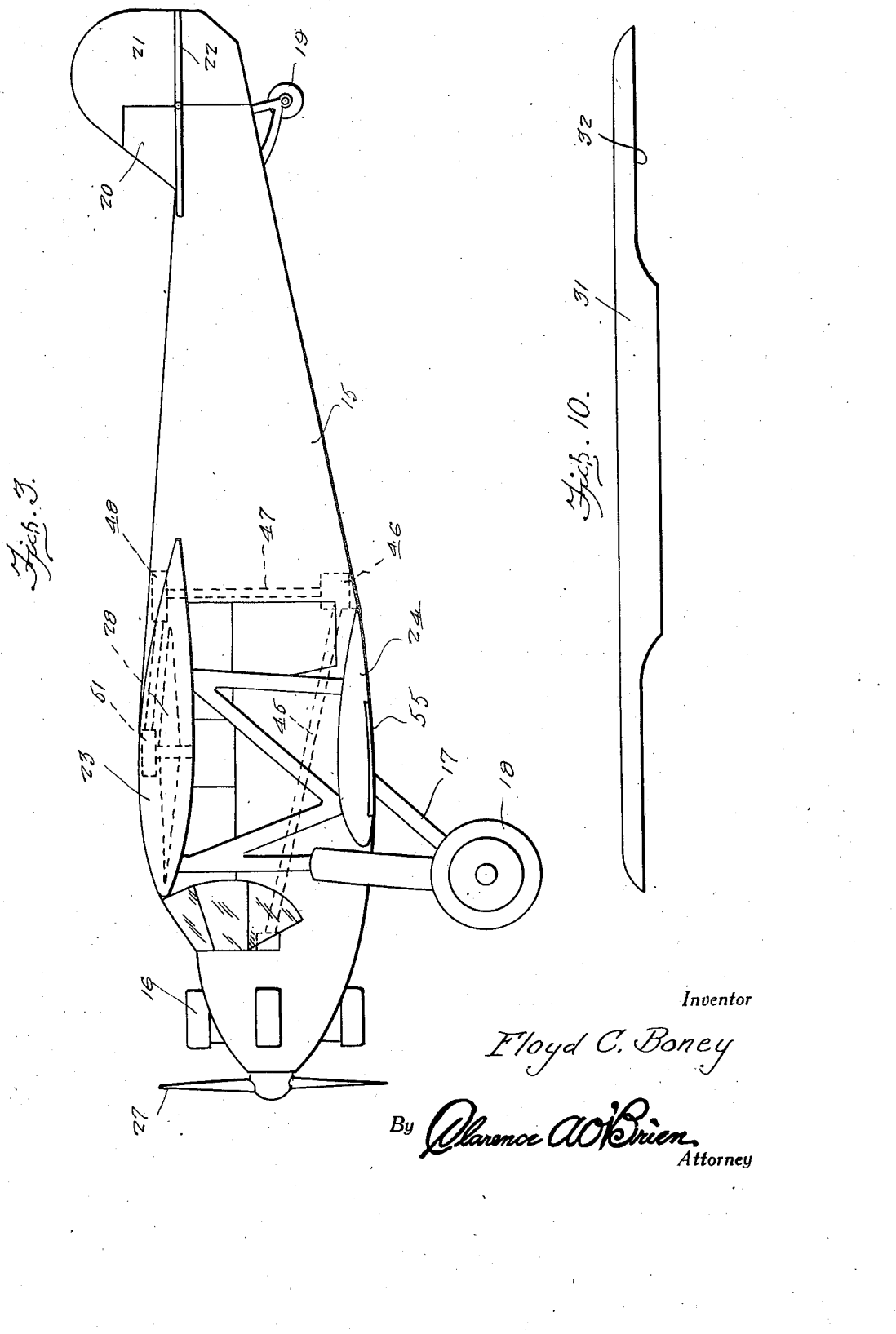

Inventor
Floyd C. Boney

By Clarence A. O'Brien
Attorney

July 1, 1930. F. C. BONEY 1,769,487
AEROPLANE
Filed Oct. 7, 1929 5 Sheets-Sheet 5
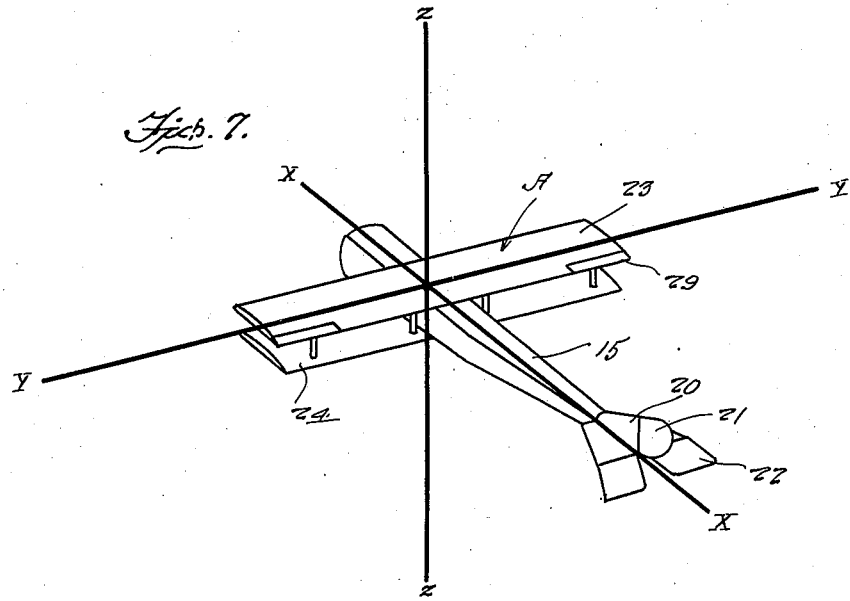
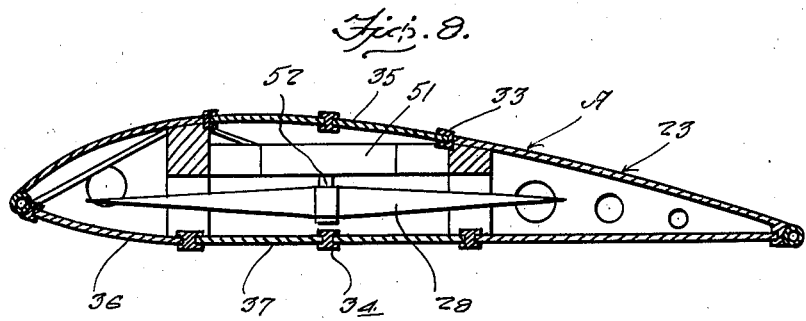
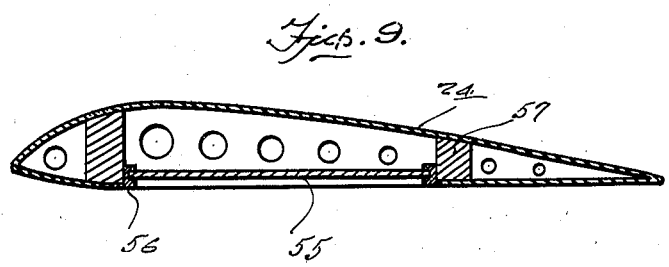
Inventor
Floyd C. Boney
By Clarence A. O'Brien
Attorney

Patented July 1, 1930

1,769,487

UNITED STATES PATENT OFFICE

FLOYD C. BONEY, OF FORT MADISON, IOWA

AEROPLANE

Application filed October 7, 1929. Serial No. 398,001.

This invention appertains to aircraft and more particularly to airships of the heavier than air type.

One of the primary objects of my invention is to provide an aeroplane embodying the principle of the helicopter and which embodies novel means for associateing the lifting propellers with the aeroplane wings or plane and novel means for arranging the same relative to the ordinary tractor propeller, whereby the aeroplane can be operated in the usual manner when in flight without any detrimental effect and controlled in the ordinary way.

A further object of my invention is the provision of an aeroplane having incorporated within the plane of the upper and lower surfaces of the wings and adjacent to each strip thereof a lifting propeller with means for permitting the operation of the propellers at a higher rate of speed than the tractor propeller during the landing and taking off of the aeroplane, and thereby permitting the aeroplane to land or take off in a substantially vertical plane and at a less speed than has heretofore been possible.

A further object of my invention is the provision of novel panels forming portions of the upper and lower surfaces of the wings with means under the control of the operator of the machine for moving the panels either to an open or closed position for either exposing or covering the lifting propeller, the panels forming means for hiding the lifting propeller from view while the plane is in normal flight so as to eliminate any drag on the aeroplane and for permitting the exposing of the lifting propeller to permit the lifting propeller to have the maximum amount of lifting effect on the air during landing or taking off.

A further important object of my invention is to provide an aeroplane of the helicopter type that will rise off the ground almost immediately, and after sufficient elevation be sustained in level flight by the use of one or more planes or wings moved edgewise through the air, under the influence of the tractor propeller.

A still further object of my invention is to provide an aeroplane of the above character which will have a structure combining lightness, strength and convenience of construction, that will not be awkward to handle in the air, or on the ground and which can be placed upon the market at a reasonable cost.

Figure 5:
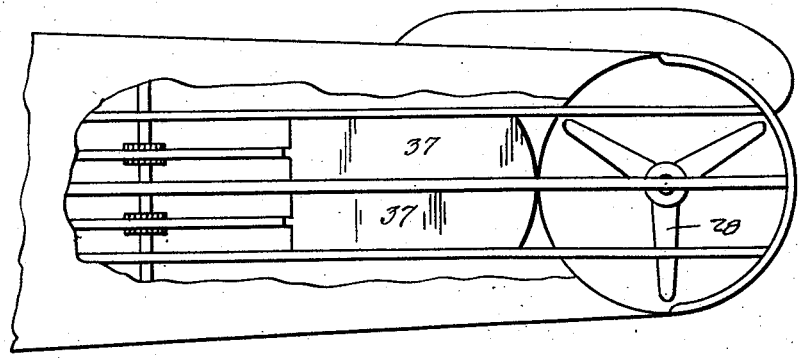
Figure 6:
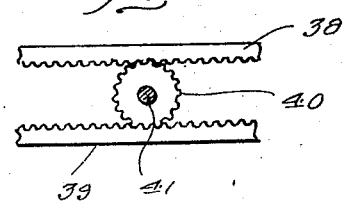

With these and other objects in view, the invention consists in the novel construction, arrangement and formation of parts as will be hereinafter more specifically described, claimed and illustrated in the accompanying drawings, in which drawings:

Figure 1 is a top plan view of an aeroplane constructed in accordance with my invention, Figure 2 is a front elevation of the same, Figure 3 is a side elevation of my improved aeroplane, Figure 4 is a top plan view of a diagrammatic nature illustrating the control for the sliding panel used for covering or exposing the helicopter screw or propellers, Figure 5 is a fragmentary plan view of an aeroplane wing constructed in accordance with my invention showing part thereof broken away and in section and illustrating the panels moved to their open position for exposing the helicopter propeller, Figure 6 is a detail section taken on the line 6—6 of Figure 4 looking in the direction of the arrow illustrating means for synchronously operating the panel at the opposite wing tips, Figure 7 is a perspective view of an aeroplane in flight of a diagrammatic nature illustrating the axis around which the aeroplane turns, Figure 8 is a transverse section through the upper wings illustrating the means of mounting the helicopter propeller in the tip thereof, Figure 9 is a transverse section through the lower wing of the aeroplane showing the novel aileron or balance plane carried thereby, Figure 10 is a front elevation of one of the bars, of the top plane or wing.

Figure 11 is a transverse section through the upper wings of the aeroplane positioned at a point inward of the helicopter screw or propeller and illustrating the guides for the sliding panel.

Referring to the drawings in detail, wherein similar reference characters designate corresponding parts throughout the several views, the letter A generally indicates my improved aeroplane, which in the present instance has been shown to be of the biplane type, but it is to be understood that the principles involved therein can be incorporated with aeroplanes of the monoplane or biplane type.

As shown in the drawings my improved aeroplane A comprises the usual fuselage 15 having mounted in the nose thereof the power plant 16 which can be of the internal combustion engine type. The fuselage carries any preferred type of landing gear embodying the ordinary front landing wheels 18 and the tail wheel 19.

The type of landing gear is immaterial, as the aeroplane may be of the seaplane or hydroplane type. The tail end of the fuselage carries the usual empennage 20 which may consist of the vertical rudder 21 and the horizontal rudder or elevator 22.

The fuselage 15 carries an upper plane or wing 23 and a lower plane or wing 24. The shape of the wings 23 and 24 may correspond to the configuration of the ordinary aeroplane, but structural features thereof differ from the ordinary wings, as will be later described.

These wings are braced in any preferred way and I have shown struts 25 and guide wires 26 between the plane and the fuselage.

The power plant 16 drives a front tractor propeller 27 in the ordinary way and the same has been shown to be of the two blade type.

My invention resides more particularly in the mounting of helicopter screws or propellers 28 in the tips of the upper wing 23 and these propellers or screws 28 are mounted in a horizontal plane and are preferably of the three bladed type.

The trailing edges of the upper plane adjacent to the tips thereof are provided with the usual ailerons 29 and it is to be noted at the present time that the tip of the upper wing 23 projects beyond the tip of the lower wing 24 so that the helicopter 28 lies substantially beyond the tips of said lower wing.

The upper wing 23 may include the usual ribs 30 and the same also include the longitudinally extending spars 31 in accordance with my invention the lower faces of these spars 31 adjacent to the opposite ends thereof are cut away as at 32 clearly shown in Figure 10 of the drawing to make room for the helicopter screws or propellers 28.

The ribs 30 and the spars 31 carrying upper and lower spaced guide tracks 33 and 34 which slidably carry the top intermediate panels 35 and top side panels 36 and lower sliding panels 37.

These panels form a part of the skin or covering for the top wing 23 and when the upper and lower panels are drawn inwardly, by means which will be later described, the helicopter screws or propellers 28 will be exposed so as to permit the same to have a maximum amount of effect on the air for permitting the vertical descending or ascending of the aeroplane.

Referring to the means for operating the upper and lower slide panels, it is to be noted that inwardly directed rack bars 38 and 39 are provided, the rack bars 38 being carried by certain of the panels and the rack bars 39 being carried by the remaining panels and, as illustrated in Figure 6 of the drawings, the rack bars 38 are arranged in a plane above the rack bars 39 and these rack bars mesh with the opposite faces of pinions 40 keyed or otherwise secured to a rotatable shaft 41 which can be carried by the spars 31.

The forward end of the operating shaft 41 can be provided with a hand crank 42 which may extend into the cockpit of the fuselage so that this shaft can be readily turned by the pilot of the aeroplane.

It is obvious that upon the turning of the shank 41, that the opposite rack bars will be moved in opposite directions either toward one another or away from one another so as to bring about synchronous covering or uncovering of the helicopter screws 28 carried by the opposite wing tip.

These helicopter screws or propellers 28 which are preferably of the three bladed type are also operated from the power plant 16 and are preferably driven at a higher rate of speed than the tractor propeller 27.

In actual practice the helicopter propellers will be driven substantially three times faster than the front tractor propeller 27 and it may be desirable to provide a variable speed transmission both for the front tractor propeller 27 and the helicopter propellers 28.

In order to operate the helicopter propellers 28 I provide a rearwardly extending drive shaft 45 leading from the power plant 16 and this shaft preferably extends under the pilot's feet and in the rear of the passenger's cabins to a gear box from which extends a vertical driven shaft 47 operated by the drive shaft 45.

This driven shaft 47 extends into an upper gear box 48 from which extends the lateral driven shafts 49 and 50 which are operated from the vertical shaft 47. The shafts 49 and 50 extend through the upper wings 23 and lead to gear boxes 51 from which depend the propeller shafts 52 for the helicopter propellers 28.

These shafts 52 are operated respectively from the lateral shafts 49 and 50. The drive shaft 45 can be connected or disconnected from the power plant 16 by the use of a suitable clutch (not shown) so as to permit the helicopter propellers 28 to be brought into and out of play at the will of the pilot.

When the helicopter screws are to be brought into play the shaft 41 is operated by the crank 42 so as to move the upper and lower panels inwardly and the helicopter screws or propellers can then act upon the air to bring about the vertical lifting of the aeroplane.

After the aeroplane has reached the desired height the panels can be moved to their closed positions and the helicopter propellers disconnected from the power plant.

When the panels are moved to their closed position, the propellers will be entirely hidden within the wings and thus will cause no drag upon the aeroplane and the top wing will have the usual and desired effect upon the air for sustaining flight.

The formation of the lower wing 24 also forms an important part of my invention and the lower surface thereof at the opposite wing tip is provided with sliding ailerons, panels or planes 55. These panels are freely slidable in guides 56 carried by the spars 57 of said lower wings.

These ailerons, planes or panels 55 are connected up and operated with the same effect as the usual aileron 29 of the upper wings 23 of the machine.

Forward motion is obtained by the front tractor propeller 27, which revolves at right angles to the lifting helicopter screw or propeller 28 in the upper wing tip. The blasts from the front tractor propeller 27 puts positive control action on the empennage or vertical and horizontal rudders 21 and 22 before the aeroplane has flying speed and the blasts from the air screw 27 puts control of the plane in the pitching and yawing movement about the axis indicated by the lines $y$—$y$ and $z$—$z$ in Figure 7 of the drawings, but it has no control of the lateral movement of the machine, the ailerons 29 having no effect for lateral control on the axis $x$—$x$ in Figure 7 of the drawings, because the aeroplane is rising almost below flying speed by action of the air screws or propellers 28 in the upper wing tips.

If the machine should tip to one side or the other on the axis indicated by the line $x$—$x$ before it had flying speed and if the left wing was low, the sliding aileron or plane 55 in the wing on the right hand side would be operated so as to slide out below the helicopter or air screw 28 to catch the air blast from said propeller 28 which would force the right wing down to a level position.

While the mode of operating the machine can be thoroughly well understood from the description already given the method of rising and descending will again be described.

In ascending, the brakes or the wheels are first set and the upper and lower sets of wing panels 35, 36 and 37 are moved to their open position. The gearing is set three to one so that the propellers 28 will revolve about three times faster than the front propeller 27, then the throttle of the power plant 16 is opened wide. The brakes are now released and the take off has started control of the machine about the axis $x$—$x$, $y$—$y$ and $z$—$z$.

After the desired elevation is attained the wing propellers 28 are disengaged and the upper and lower sets of panels are closed over and under the wing tip propellers 28. Level flight is maintained forward and everything being enclosed, no machinery is disclosed to cause a drag, or endanger the lives of persons on the ground, (except the front propeller).

When the pilot wishes to land, he can come into the field stalling the machine off, that is tilting the machine at a great angle of incidence. Before he starts the setting down action, he opens the upper and lower set of panels at the tip of the upper wing and engages the wing tip propellers 28.

The wing tip propellers 28 will hold the machine off the ground with the machine moving slowly forward and the machine can be guided gradually through the field.

Changes in details may be made without departing from the spirit or the scope of this invention, but having thus described my invention, what I claim as new is:

1. An aeroplane comprising a fuselage, an upper wing and a lower wing, the tip of the upper wing extending beyond the tips of the lower wing, a propeller rotating about a horizontal axis for maintaining forward flight, and propellers rotating about a vertical axis for maintaining vertical flight carried by the tips of the upper wings and ailerons carried by the tips of the lower wing and adapted to be projected into the blasts of air from the last mentioned propellers.

2. In an aeroplane, a wing, propellers rotatable about a vertical axis housed within the wing tips within the planes of the upper and lower surfaces of said wing, guide tracks carried by the wing adjacent to the upper and lower surfaces thereof, sets of sliding panels mounted in the tracks above and below the propellers, inwardly directed rack bars connected with the panels, the rack bars for the panels of one wing tip being arranged in a plane below the rack bars or the panels of the opposite wing, an operating shaft, pinions secured to the operating shaft having the opposite sides thereof engaging the rack bar, and means for operating the shaft.

3. In an aeroplane an upper wing and a lower wing terminating short of the opposite ends of the upper wing, propellers rotatable about a vertical axis carried by the tips of the upper wing, guide tracks carried by the tips of the lower wing, panels slidably mounted in said guide tracks, the panels being adapted to be projected below the propeller upon the lateral shifting of the aeroplane in landing or taking off.

In testimony whereof I affix my signature.

FLOYD C. BONEY.